United States Patent
Park et al.

(10) Patent No.: US 10,606,120 B2
(45) Date of Patent: Mar. 31, 2020

(54) DISPLAY DEVICE

(71) Applicant: Samsung Display Co., Ltd., Yongin-si, Gyeonggi-do (KR)

(72) Inventors: Keunwoo Park, Incheon (KR); Taejin Kong, Suwon-si (KR); Yeogeon Yoon, Suwon-si (KR); Hee-keun Lee, Suwon-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 2 days.

(21) Appl. No.: 16/123,985

(22) Filed: Sep. 6, 2018

(65) Prior Publication Data

US 2019/0079352 A1    Mar. 14, 2019

(30) Foreign Application Priority Data

Sep. 11, 2017 (KR) .................. 10-2017-0116164

(51) Int. Cl.
*G02F 1/1335* (2006.01)
*G02F 1/133* (2006.01)
(Continued)

(52) U.S. Cl.
CPC ...... *G02F 1/133528* (2013.01); *G02F 1/1339* (2013.01); *G02F 1/13306* (2013.01); *G02F 1/133514* (2013.01); *G02F 1/133553* (2013.01); *G02F 1/133617* (2013.01); *G02F 1/133621* (2013.01); *G02F 1/136209* (2013.01); *G02F 1/1368* (2013.01); *G02F 1/13394* (2013.01);
(Continued)

(58) Field of Classification Search
CPC ......... G02F 1/133514; G02F 1/133528; G02F 1/136209; G02F 1/133553; G02F 1/133602–133606
See application file for complete search history.

(56) References Cited

U.S. PATENT DOCUMENTS 7,750,984 B2   7/2010   Ha et al.
8,013,821 B2   9/2011   Park
(Continued)

FOREIGN PATENT DOCUMENTS

KR   10-2010-0075731 A   7/2010
KR   10-2012-0078156 A   7/2012
KR      10-1251543 B1    4/2013

*Primary Examiner* — Dung T Nguyen
(74) *Attorney, Agent, or Firm* — Lewis Roca Rothgerber Christie LLP

(57) ABSTRACT

A display device includes: a liquid crystal layer disposed between a first substrate and a second substrate; a color conversion layer disposed between the first substrate and the second substrate and including a first light emitter configured to absorb first color light outputted from a light source and to emit second color light that is different from the first color light; a pixel electrode overlapping a display area; a first transistor connected to the pixel electrode; a driving circuit including a second transistor and providing a driving signal to the first transistor; a light blocking member disposed on the first substrate and overlapping the first transistor; and an polarizing layer disposed between the liquid crystal layer and the color conversion layer and including a wire grid pattern overlapping the display area and a reflection pattern extending from the wire grid pattern to overlap the non-display area.

20 Claims, 10 Drawing Sheets

(51) Int. Cl.
*G02F 1/1362* (2006.01)
*G02F 1/1339* (2006.01)
*G02F 1/1343* (2006.01)
*G02F 1/1333* (2006.01)
*G02F 1/1368* (2006.01)

(52) U.S. Cl.
CPC ............ *G02F 1/134309* (2013.01); *G02F 2001/133388* (2013.01); *G02F 2001/133548* (2013.01); *G02F 2001/133565* (2013.01); *G02F 2001/133614* (2013.01); *G02F 2201/123* (2013.01); *G02F 2203/055* (2013.01)

(56) References Cited

U.S. PATENT DOCUMENTS

| | | | |
|---|---|---|---|
| 8,525,958 B2 * | 9/2013 | Lee | G02F 1/133536 349/114 |
| 8,952,946 B2 | 2/2015 | Fukunaga et al. | |
| 2013/0242228 A1 | 9/2013 | Park et al. | |
| 2015/0070762 A1 * | 3/2015 | An | G02B 5/3058 359/485.05 |
| 2018/0269362 A1 * | 9/2018 | Lee | H01L 33/502 |
| 2019/0049781 A1 * | 2/2019 | Jiang | G02F 1/133514 |

* cited by examiner

DISPLAY DEVICE

CROSS-REFERENCE TO RELATED APPLICATION

This application claims priority to and the benefit of Korean Patent Application No. 10-2017-0116164, filed on Sep. 11, 2017, the entire content of which is hereby incorporated by reference.

BACKGROUND

The present disclosure relates to a display device, and more particularly, to a display device including a color conversion member including a light emitter.

Various display devices that are used in multimedia apparatuses (such as a television, a mobile phone, a tablet computer, a navigation device, a game device, etc.) are being developed. Also, a Photo-Luminescent Liquid Crystal Display (LCD) that increases light utilization efficiency and improves color balance is recently under development.

Various display devices have limitations in reflection and scattering of external light on a display surface when used in an outdoor environment where rich external light is present. To solve such limitations associated with display quality, a polarizing member in which a polarizer and a phase retardation layer are combined is used.

SUMMARY

Aspects of embodiments of the present disclosure are directed toward a display device capable of protecting a driving transistor disposed in a non-display area.

An embodiment of the inventive concept provides a display device including: a display panel including a display area and a non-display area; and a light source configured to output a first color light to the display panel, wherein the display panel comprises: a first substrate; a second substrate facing the first substrate and disposed farther from the light source than the first substrate; a liquid crystal layer disposed between the first substrate and the second substrate; a color conversion layer disposed between the liquid crystal layer and the second substrate and including a first light emitter configured to absorb a first color light outputted from the light source and to emit a second color light that is different from the first color light; a pixel electrode overlapping the display area and disposed between the first substrate and the second substrate; a first transistor connected to the pixel electrode; a driving circuit including a second transistor overlapping the non-display area, and providing a driving signal to the first transistor; a light blocking member disposed on the first substrate and overlapping the first transistor; and an polarizing layer disposed between the liquid crystal layer and the color conversion layer, and including a wire grid pattern overlapping the display area and a reflection pattern extending from the wire grid pattern to overlap the non-display area, wherein the light blocking member has the same color component as the second color light.

In an embodiment, the color conversion layer may include a conversion unit overlapping the display area and including the first light emitter, and a dummy conversion unit overlapping the non-display area.

In an embodiment, the dummy conversion unit may fully overlap the reflection pattern.

In an embodiment, the color conversion layer may further include a second light emitter absorbing the first color light to emit a third color light that is different from the second color light.

In an embodiment, the dummy conversion unit may include any one of the first light emitter and the second light emitter.

In an embodiment, the conversion unit may include: a first conversion unit including the first light emitter; a second conversion unit including the second light emitter; and a third conversion unit configured to transmit the first color light.

In an embodiment, the first to third conversion units may be disposed to be spaced apart from each other when viewed in a plane, and the color conversion layer may further include a blocking member disposed between the first to third conversion units that are spaced apart from each other.

In an embodiment, the color conversion layer may further include an optical filter unit configured to reflect the first color light.

In some embodiments, the optical filter unit may include: a first optical filter unit disposed on the first conversion unit and configured to transmit the second color light; and a second optical filter disposed on the second conversion unit and configured to transmit the third color light.

In an embodiment, the particle size of the first light emitter may be different from the particle size of the second light emitter.

In an embodiment, the light blocking member may include: a first light blocking member overlapping the first transistor; and a second light blocking member overlapping the second transistor.

In an embodiment, each of the first light blocking member and the second light blocking member may have a red component to block blue light (e.g., may be in red color).

In an embodiment, the dummy conversion unit may include the first light emitter, and the first color light may be blue light, and the second color light may be red light.

In an embodiment, the display device may further include a first column spacer disposed on the first light blocking member; and a second column spacer disposed on the second light blocking member.

In an embodiment, the display device may further include a sealing member overlapping the non-display area and connecting the first substrate to the second substrate, wherein the reflection pattern overlaps the remaining non-display area other than the area of the non-display area overlapping the sealing member.

In an embodiment, the display device may further include a light control layer disposed between the color conversion layer and the polarizing layer, and configured to transmit the first color light and reflect the second color light.

In an embodiment, the first color light may be blue light, and the second color light may be any one of green light and red light.

In an embodiment, the polarizing layer may further include a protection pattern disposed on the reflection pattern and on the wire grid pattern.

In an embodiment of the inventive concept, a display device includes: a display panel including a display area and a non-display area; and a light source configured to output a first color light to the display panel, wherein the display panel includes: a first substrate; a second substrate facing the first substrate and disposed farther from the light source than the first substrate; a color conversion unit disposed on the second substrate, overlapping the display area, and configured to absorb the first color light outputted from the light source to emit a second color light that is different from the first color light; an first polarizing layer disposed on the color conversion unit and including a wire grid pattern overlapping the display area and a reflection pattern extending from the wire grid pattern to overlap the non-display area; and a second polarizing layer disposed under the first substrate, wherein a dummy conversion unit fully overlaps the reflection pattern.

In an embodiment, the polarizing layer may have a polarizing axis in a first direction, and the first polarizing layer may have a polarizing axis in a second direction orthogonal to the first direction.

BRIEF DESCRIPTION OF THE FIGURES

The accompanying drawings are included to provide a further understanding of the inventive concept, and are incorporated in and constitute a part of this specification. The drawings illustrate exemplary embodiments of the inventive concept and, together with the description, serve to explain principles of the inventive concept. In the drawings.

DETAILED DESCRIPTION

Figure 1:
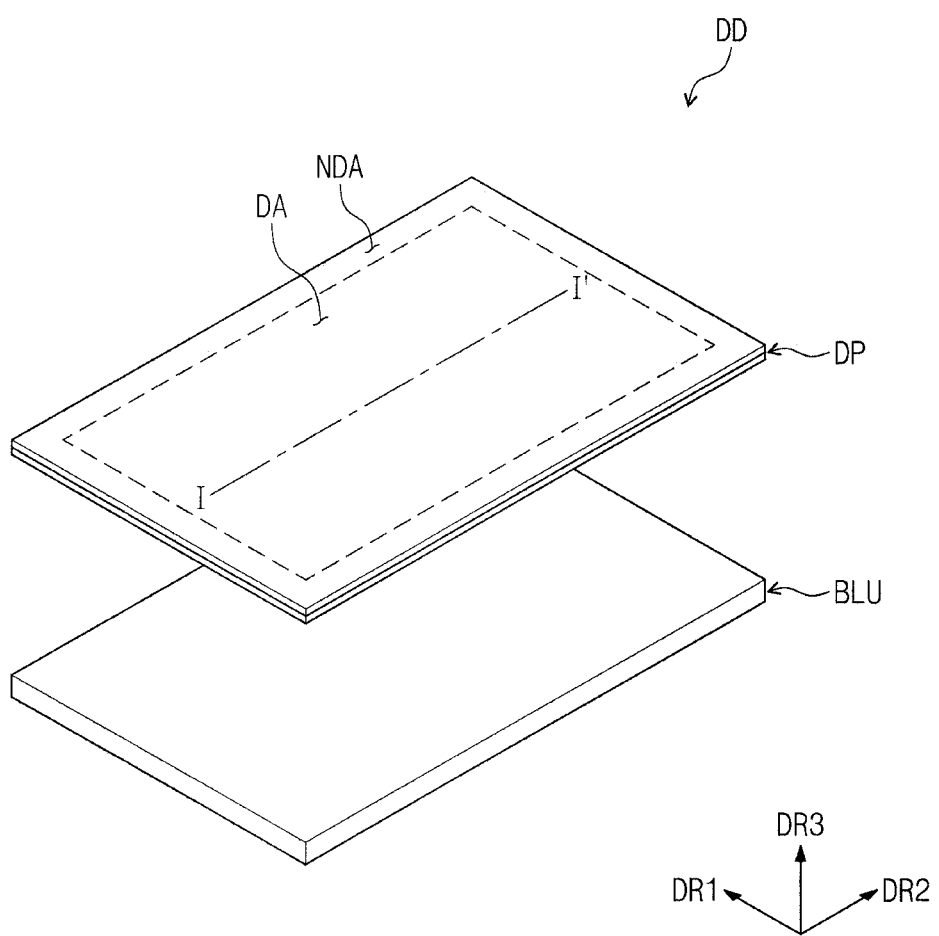
FIG. 1 is an exploded perspective view of a display device according to an embodiment of the inventive concept.

The embodiments according to the inventive concept may be variously modified and may have multiple forms. Thus, specific embodiments are illustrated in the drawings or described in more detail in this specification or application. However, this is not intended to limit the embodiments according to the inventive concept as the specific disclosed forms; rather it should be understood that all variations, equivalents or substitutes contained in the concept and technical scope of the present invention are also included.

With regard to figures, like reference numerals refer to like elements. Elements shown in accompanying drawings are scaled up or down for clarity of the inventive concept. The terms 'first' and/or 'second' may be used to describe various elements; however, the elements should not be limited by these terms. These terms are merely used for the purpose of discriminating one element from another element. For example, the first element may be designated as the second element, and vice versa, without departing from the spirit or scope of the inventive concept. A singular form, otherwise indicated, includes a plural form.

Herein, the term "comprise" or "have" intends to mean that there may be specified features, numerals, steps, operations, elements, parts, or combinations thereof, not excluding the possibility of the presence or addition of the specified features, numerals, steps, operations, elements, parts, or combinations thereof. Further, the use of "may" when describing embodiments of the present invention refers to "one or more embodiments of the present invention." When a first element is described as being "coupled" or "connected" to a second element, the first element may be directly "coupled" or "connected" to the second element, or one or more other intervening elements may be located between the first element and the second element. Spatially relative terms, such as "beneath", "below", "lower", "downward", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass an orientation of above or below. The device may be otherwise oriented (rotated 90 degrees or at other orientations) and the spatially relative descriptors used herein interpreted accordingly.

Figure 2:
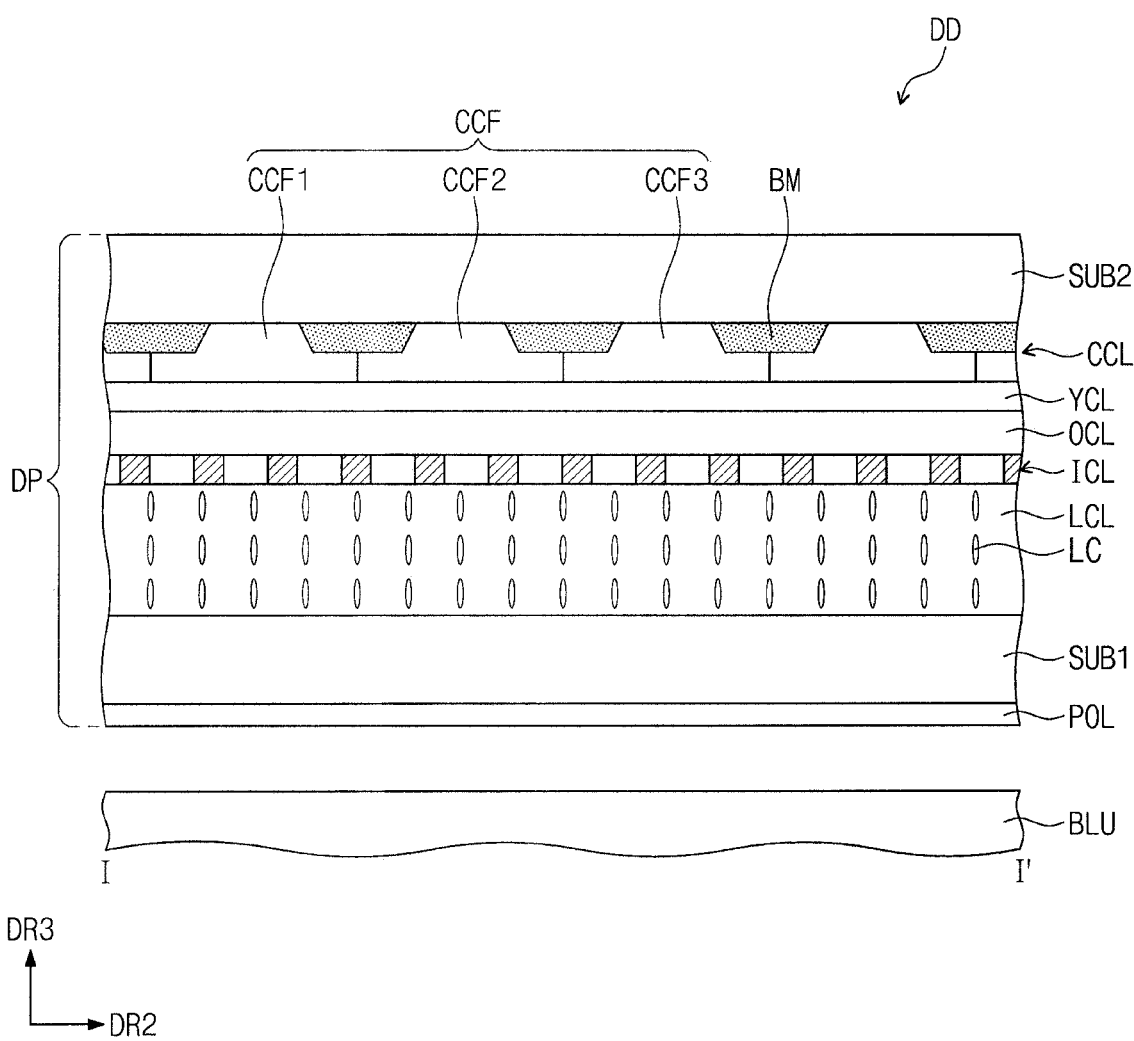
FIG. 2 is a cross-sectional view taken along line I-I' of FIG. 1 according to an embodiment of the inventive concept.
Figure 3:
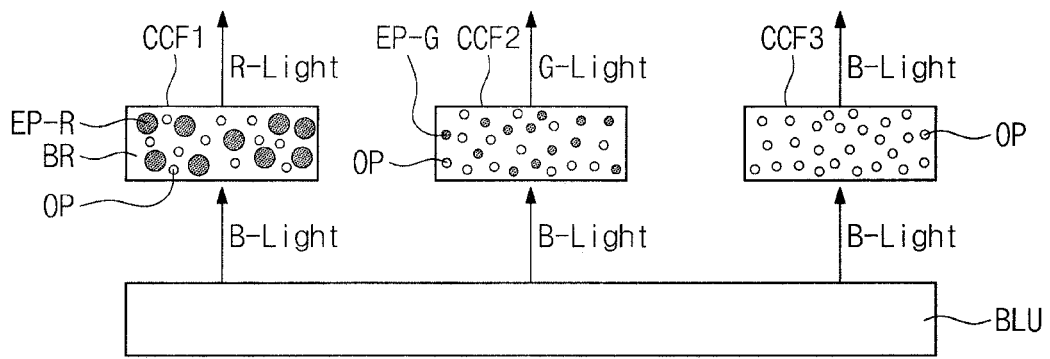
FIG. 3 is a view schematically illustrating optical characteristics of a conversion unit according to an embodiment of the inventive concept.

FIG. 1 is an exploded perspective view of a display device according to an embodiment of the inventive concept. FIG. 2 is a cross-sectional view taken along line I-I' of FIG. 1 according to an embodiment of the inventive concept. FIG. 3 is a view schematically illustrating optical characteristics of a conversion unit according to an embodiment of the inventive concept.

According to an embodiment of the inventive concept, a display device DD illustrated in FIG. 1 may be applied to a tablet PC, a smart phone, a personal digital assistant (PDA), a portable multimedia player (PMP), a game device, a wrist watch, an electronic device, etc. The display device DD may also be applied to small/medium-sized electronic equipment (such as a personal computer, a notebook computer, a car navigation unit, or a camera) as well as large-sized electronic equipment (such as a large TV or an outdoor billboard).

Referring to FIG. 1, the display device DD may include a display panel DP and a light source BLU providing light to the display panel DP. The display panel DP is configured to provide an image, and the light source BLU may generate a first color light.

The light source BLU may be disposed under the display panel DP to provide the first color light to the display panel DP. The first color light provided from the light source BLU may be blue light. Also, the first color light may be ultraviolet light. For example, the light source BLU may provide light in a wavelength range between 350 nm and 450 nm inclusive.

The light source BLU may include a plurality of light emitting devices. The light emitting devices may emit blue light as a first color light. The light source BLU may include a plurality of light emitting devices and a circuit substrate for supplying power to the light emitting devices. The light emitting devices may be disposed on the circuit substrate.

The first color light generated from the light source BLU may be provided to the display panel DP. The display panel DP may be disposed on the light source BLU. The display panel DP may include a display area DA for displaying an image and a non-display area NDA for not displaying an image. The non-display area NDA may be disposed adjacent to the display area DA. For example, the non-display area NDA may surround the display area DA.

According to an embodiment of the inventive concept, the display panel DP may be provided as any one of an organic light emitting display panel, a liquid crystal display panel, a plasma display panel, an electrophoretic display panel, a microelectromechanical system (MEMS) display panel, and an electrowetting display panel.

Hereinafter, the display panel DP according to embodiments of the inventive concept will be described as a liquid crystal display panel. The display panel DP can be categorized as: a twisted nematic liquid crystal display device, a horizontal electric field liquid crystal display device, or a vertically aligned liquid crystal display device, based on characteristics of a liquid crystal layer. Out of these, the display panel DP according to embodiments of the inventive concept may be provided as the vertically aligned liquid crystal display panel which is oriented in a set or predetermined direction in a state where no electric field is applied and in which a long axis of liquid crystal molecules is arranged normal or perpendicular to the substrate surface.

Further, the display panel DP is parallel to a surface defined by a first direction DR1 and a second direction DR2. The normal direction of the display panel DP is indicated by a third direction DR3. The third direction DR3 indicates the thickness direction of the display panel DP. An upper surface (front surface) and a lower surface (rear surface) of each of the members are divided by the third direction DR3. However, directions indicated by the directions DR1, DR2, DR3 are relative concepts, and may thus be converted to other directions.

Meanwhile, according to the description of the inventive concept, the display device DD is illustrated as having a flat shape, but embodiments are not limited thereto. In an embodiment, the display device DD may be a curved display device. For example, the display device DD may be a generally concavely curved display device or a generally convexly curved display device when viewed by a user. Further, the display device may be bent only at a portion thereof.

Furthermore, the display device according to an embodiment may be a flexible display device. For example, the display device may be a foldable display device, or a rollable display device.

In an embodiment, the display area DA of the display panel DP may include a plurality of pixel areas. The pixel areas may be, for example, defined by a plurality of gate lines and a plurality of data lines. The pixel areas may be disposed in a matrix form. A pixel may be disposed in each of the pixel areas. This will be described in more detail with reference to FIGS. 3 and 4.

Referring to FIG. 2, a cross-sectional view of the display panel DP overlapping the display area DA is illustrated. The display panel DP may include a first substrate SUB1 and a second substrate SUB2 that are opposed to each other, and may also include a liquid crystal layer LCL. The liquid crystal layer LCL may be disposed between the first substrate SUB1 and the second substrate SUB2.

The first substrate SUB1 and the second substrate SUB2 may each be independently a polymer substrate, a plastic substrate, a glass substrate, a quartz substrate, or the like. The first substrate SUB1 and the second substrate SUB2 may be transparent insulating substrates. The first substrate SUB1 and the second substrate SUB2 may each be rigid. The first substrate SUB1 and the second substrate SUB2 may each be flexible.

Also, in one embodiment, a common electrode and a pixel electrode may be between the first substrate SUB1 and the second substrate SUB2. In one embodiment, the pixel electrode may be between the second substrate SUB2 and the common electrode. In one embodiment, the common electrode may abut the first substrate SUB1, and the pixel electrode may abut the second substrate SUB2.

The pixel electrode may be disposed on an upper surface of the first substrate SUB1. The common electrode may be disposed on a lower surface of the second substrate SUB2. Here, the upper surface of the first substrate SUB1 may be one surface adjacent to the liquid crystal layer LCL and facing the second substrate SUB2, and the lower surface of the second substrate SUB2 may be one surface adjacent to the liquid crystal layer LCL and facing the first substrate SUB1.

The liquid crystal layer LCL is disposed between the first substrate SUB1 and the second substrate SUB2, and includes a plurality of liquid crystal molecules LC. The liquid crystal layer LCL may be provided by having an arrangement of the liquid crystal molecules LC having dielectric anisotropy therein. Conventionally used liquid crystal molecule may be used for the liquid crystal layer LCL without a particular limitation, and for example, an alkenyl-based liquid crystal compound or an alkoxy-based liquid crystal compound may be used for the liquid crystal molecule LC. The liquid crystal molecule LC used in an embodiment may have negative dielectric anisotropy, but embodiments are not limited thereto, and for example, the liquid crystal molecule LC having positive dielectric anisotropy may also be used.

The color conversion layer CCL may be disposed between the liquid crystal layer LCL and the second substrate SUB2. The color conversion layer CCL may be disposed on the second substrate SUB2. The color conversion layer CCL may include a light emitter absorbing a first color light provided by the light source BLU to emit light in different color from the first color.

For further details with reference to FIG. 3, the color conversion layer CCL may include a first conversion unit CCF1 including a first light emitter EP-R, a second conversion unit CCF2 including a second light emitter EP-G, and a third conversion unit CCF3 transmitting a first color light.

For example, the first light emitter EP-R may absorb the first color light which is blue light B-light to emit red light R-light, and the second light emitter EP-G may absorb the first color light which is blue light to emit green light G-light. Hereinafter, the red light will be described as the second color light, and the green light will be described as the third color light. That is, the first conversion unit CCF1 may be a light emitting area for emitting the red light, and the second conversion unit CCF2 may be a second light emitting area for emitting the green light.

Further, the third conversion unit CCF3 may be a portion including no light emitter. The third conversion unit CCF3 may be a portion configured to transmit the first color light provided from the light source BLU. That is, the third conversion unit CCF3 may be a light emitting area for emitting the blue light.

The first to third conversion units CCF1, CCF2, CCF3 may each include a base resin BR. The base resin BR may be a polymer resin. For example, the base resin BR may be an acrylic resin, a urethane resin, a silicone resin, an epoxy resin, or the like. The base resin BR may be a transparent resin.

Further, the first to third conversion units CCF1, CCF2, CCF3 may each further include scattering particles OP. The scattering particles OP may be $TiO_2$, or silica-based nanoparticles. The scattering particles OP may scatter light emitted from the light emitter, thereby emitting the scattered light to the outside of the conversion unit. Further, if the light provided is transmitted as it is and is in the third conversion unit CCF3, the scattering particles OP may scatter the light provided, thereby emitting the scattered light to the outside.

The first and second light emitters EP-R, EPG (hereinafter referred to as light emitters) contained in the color conversion layer CCL may be phosphors and/or quantum dots. That is, in an embodiment, the color conversion layer CCL may include the phosphor and/or the quantum dot as each of the light emitters EP-R, EP-G.

For example, the phosphor may be used as each of the light emitters EP-R, EP-G and may be an inorganic phosphor. The phosphor used as the light emitters EP-R, EP-G in the display device DD of an embodiment may be a green phosphor or a red phosphor.

The green phosphor may be at least any one selected from a group consisting of $YBO_3$: $Ce^{3+}$, $Tb^{3+}$, $BaMgAl_{10}O_{17}$: $Eu^{2+}$, $Mn^{2+}$, $(Sr,Ca,Ba)(Al, Ga)_2S_4$:$Eu^{2+}$; ZnS: Cu, Al, $Ca_8Mg(SiO_4)_4Cl_2$: $Eu^{2+}$, $Mn^{2+}$; $Ba_2SiO_4$: $Eu^{2+}$; $(Ba, Sr)_2SiO_4$: $Eu^{2+}$; $Ba_2(Mg, Zn)Si_2O_7$: $Eu^{2+}$; $(Ba,Sr)Al_2O_4$: $Eu^{2+}$, $Sr_2Si_3O_8.2SrCl_2$: $Eu^{2+}$ and the like.

The red phosphor may be at least any one selected from a group consisting of $(Sr,Ca,Ba,Mg)P_2O_7$: $Eu^{2+}$, $Mn^{2+}$, $CaLa_2S_4$: $Ce^{3+}$; $SrY_2S_4$: $Eu^{2+}$, $(Ca,Sr)S$: $Eu^{2+}$, SrS: Eu, $Eu^{2+}$, $Y_2O_3$: $Eu^{3+}$, $Bi^{3+}$; $YVO_4$: $Eu^{3+}$, $Bi^{3+}$; $Y_2O_2S$: $Eu^{3+}$, $Bi^{3+}$; $Y_2O_2S$: $Eu^{3+}$, and the like.

Meanwhile, a kind of phosphor used in the color conversion layer CCL of an embodiment is not limited to the disclosed material, and a known phosphor material other than the above-mentioned phosphor may be used.

As another example, the light emitters EP-R, EP-G included in the color conversion layer CCL may be the quantum dot. The quantum dot may be selected from Group II-VI compounds, Group III-V compounds, Group IV-VI compounds, Group IV elements, Group IV compounds, and, combinations thereof.

The Group II-VI compound may be selected from a group consisting of: a binary compound selected from a group consisting of CdSe, CdTe, ZnS, ZnSe, ZnTe, ZnO, HgS, HgSe, HgTe, MgSe, MgS, and a mixture thereof; a ternary compound selected from a group consisting of CdSeS, CdSeTe, CdSTe, ZnSeS, ZnSeTe, ZnSTe, HgSeS, HgSeTe, HgSTe, CdZnS, CdZnSe, CdZnTe, CdHgS, CdHgSe, CdHgTe, HgZnS, HgZnSe, HgZnTe, MgZnSe, MgZnS, and mixtures thereof; and a quaternary compound selected from a group consisting of HgZnTeS, CdZnSeS, CdZnSeTe, CdZnSTe, CdHgSeS, CdHgSeTe, CdHgSTe, HgZnSeS, HgZnSeTe, HgZnSTe, and mixtures thereof.

The Group III-V compounds may be selected from a group consisting of: a binary compound selected from a group consisting of GaN, GaP, GaAs, GaSb, AlN, AlP, AlAs, AlSb, InN, InP, InAs, InSb, and mixtures thereof; a ternary compound selected from a group consisting of GaNP, GaNAs, GaNSb, GaPAs, GaPSb, AlNP, AlNAs, AlNSb, AlPAs, AlPSb, InNP, InNAs, InNSb, InPAs, InPSb, GaAlNP, and mixtures thereof; and a quaternary compound selected from a group consisting of GaAlNAs, GaAlNSb, GaAlPAs, GaAlPSb, GaInNP, GaInNAs, GaInNSb, GaInPAs, GaInPSb, InAlNP, InAlNAs, InAlNSb, InAlPAs, InAlPSb, and mixtures thereof. The Group IV-VI compounds may be selected from a group consisting of: a binary compound selected from a group consisting of SnS, SnSe, SnTe, PbS, PbSe, PbTe, and mixtures thereof; a ternary compound selected from a group consisting of SnSeS, SnSeTe, SnSTe, PbSeS, PbSeTe, PbSTe, SnPbS, SnPbSe, SnPbTe, and mixtures thereof; and a quaternary compound selected from a group consisting of SnPbSSe, SnPbSeTe, SnPbSTe, and mixtures thereof. The Group VI element may be selected from a group consisting of Si, Ge, and mixtures thereof. The Group VI compound may be a binary compound selected from a group consisting of SiC, SiGe, and mixtures thereof.

Here, the binary compound, the ternary compound, or the quaternary compound may be present in a particle at a uniform concentration, or may be present in the same particle at a concentration distribution thereof being divided into a partially different state.

The quantum dot may be a core-shell structure including a core and a shell surrounding the core. Further, the quantum dot may also have a core/shell structure in which one quantum dot surrounds another quantum dot. An interface between the core and the shell may have a concentration gradient in which the concentration of an element present in the interface and/or the shell becomes lower as it travels closer to the center.

The quantum dot may be a particle having a nanometer scale size. The quantum dot may have a full width of half maximum (FWHM) of an emission wavelength spectrum of about 45 nm or less, preferably about 40 nm or less, more preferably about 30 nm or less, and color purity or color reproductivity may be improved in these ranges. Further, since the light emitted through such quantum dots is emitted in all directions, a wide viewing angle characteristic may be improved.

Furthermore, the shapes of quantum dots are not particularly limited to existing shapes in the art; however, more specifically, the quantum dots in shapes of sphere, pyramid, multi-arm and/or cubic nanoparticle, nanotube, nanowire, nanofiber, and/or nano platelet may be used.

According to an embodiment of the inventive concept, in the quantum dot, the color of light being emitted may vary according to the particle size. If the first light emitter EP-R and the second light emitter EP-G are quantum dots, the particle size of the first light emitter EP-R may be different from the particle size of the second light emitter EP-G. For example, the particle size of the first light emitter EP-R may be less than the particle size of the second light emitter EP-G. Here, the first light emitter EP-R may emit light of a shorter wavelength than the second light emitter EP-G.

Referring to FIG. 2 again, a blocking member BM may be disposed between the conversion units that are disposed to be spaced from each other. The blocking member BM may be embodied in black color, and may be included in the color conversion layer CCL. The blocking member BM may be formed by including an organic or inorganic blocking material including a black pigment or dye. The blocking member BM may prevent or protect from a light leakage phenomenon, and delimit a boundary between adjacent conversion units.

A light control layer YCL may be disposed on the color conversion layer CCL. The light control layer YCL may overlap the display area DA and the non-display area NDA, and may be disposed on the color conversion layer CCL. The light control layer YCL may transmit the incident first color light, and absorb a portion of the incident second and third color lights. Meanwhile, the light control layer YCL may be disposed to overlap only the display area DA, or may not be provided depending on embodiments.

An overcoating layer OCL may be disposed on the light control layer YCL.

Further, the display panel DP includes a polarizing layer POL and an in-cell polarizing layer ICL. The polarizing layer POL has a polarizing axis in one direction, and the in-cell polarizing layer ICL may have a polarizing axis in another direction orthogonal to the one direction.

As shown in FIG. 2, the polarizing layer POL may be disposed on the lower surface of the first substrate SUB1. The polarizing layer POL may transmit light oscillating in a direction parallel to the polarizing axis in the one direction. The polarizing layer POL may be a coated polarizing layer or a deposited polarizing layer. The polarizing layer POL may be formed by coating a material including a dichroic dye and a liquid crystal compound.

The in-cell polarizing layer ICL may be disposed between the color conversion layer CCL and the liquid crystal layer LCL. The in-cell polarizing layer ICL may transmit light oscillating in a direction orthogonal to the one direction.

According to embodiments, the in-cell polarizing layer ICL may be provided in a metallic material, and may include at least one or more materials of Al, Ag, and molybdenum-titanium oxide (MTO).

According to embodiments of the inventive concept, the in-cell polarizing layer ICL may include a wire grid pattern overlapping the display area DA and a reflection pattern overlapping the non-display area NDA.

The wire grid pattern may overlap the display area DA, thereby transmitting light which has transmitted the polarizing layer POL in the direction orthogonal to the one direction. The wire grid pattern and the reflection pattern of the in-cell polarizing layer ICL will be described later with reference to FIGS. 6, 8A and 8B.

The reflection pattern may overlap the non-display area, thereby reflecting incident light. The reflection pattern may have a shape extending from the wire grid pattern. According to embodiments, the color conversion layer CCL may overlap the non-display area NDA, and include a dummy conversion unit disposed on the second substrate SUB2.

The dummy conversion unit may include any one of the above-mentioned light emitters EP-R, EP-G. The light emitter of the dummy conversion unit may receive light delivered from the display area DA to emit red or green light. In this case, the green or red light may be scattered by scattering particles included in the dummy conversion unit. As a result, the light outputted from the dummy conversion unit may be delivered to a driving element disposed on the first substrate SUB1. The driving element may be a circuit element disposed on the first substrate SUB1 so as to overlap the non-display area NDA and provide driving signals to pixels disposed in the display area DA.

Meanwhile, if the light outputted from the dummy conversion unit is delivered to the driving element disposed on the first substrate SUB1, the driving element may be damaged or degraded.

According to embodiment of the inventive concept, the dummy conversion unit may entirely overlap the reflection pattern. As a result, in the non-display area NDA, the light scattered from the dummy conversion unit may not be delivered to the driving element disposed on the first substrate SUB1 by the reflection pattern. This will be described in more detail with reference to FIG. 6.

Figure 4:
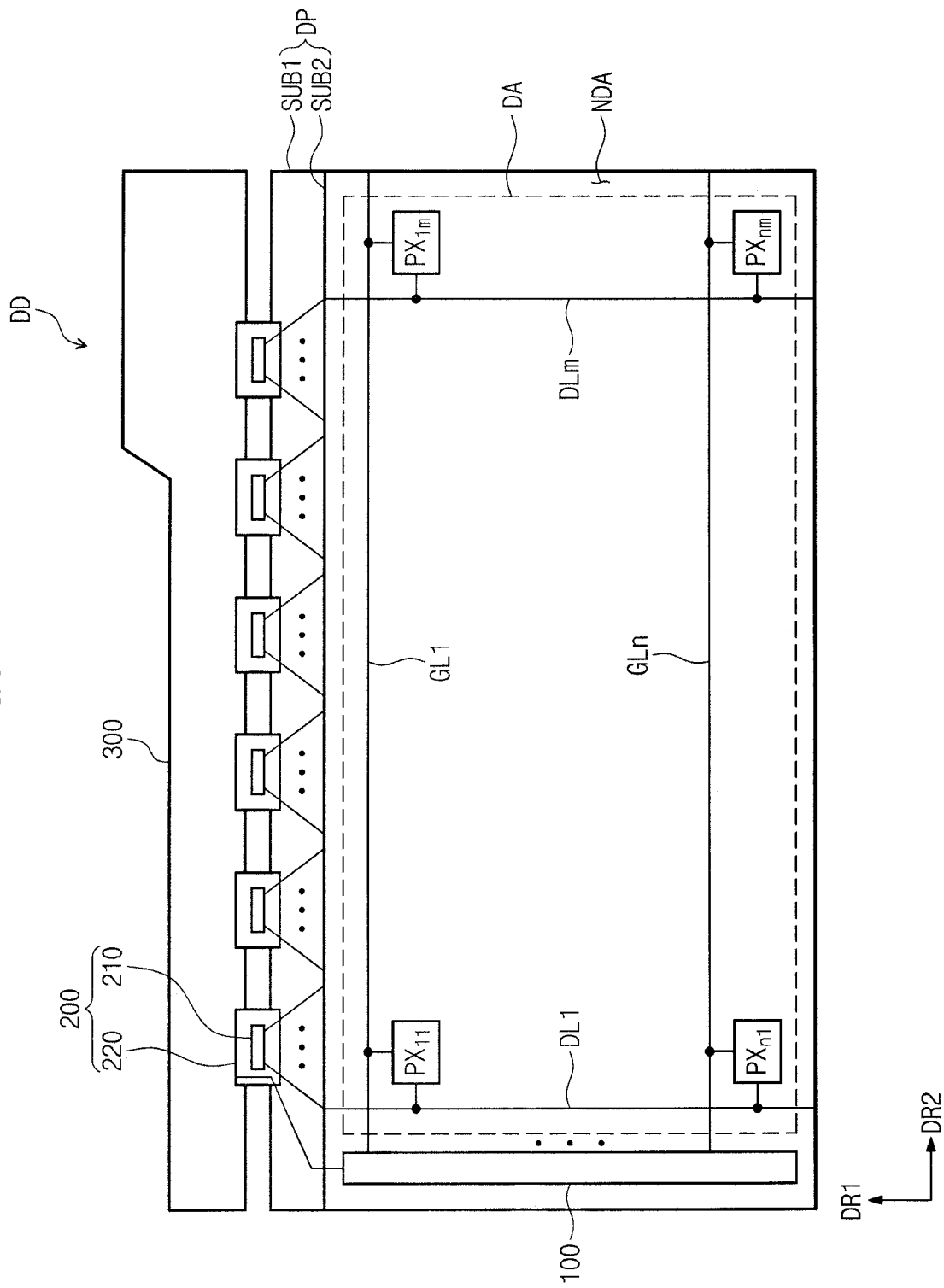
FIG. 4 is a block diagram of a display device according to an embodiment of the inventive concept.
Figure 5:
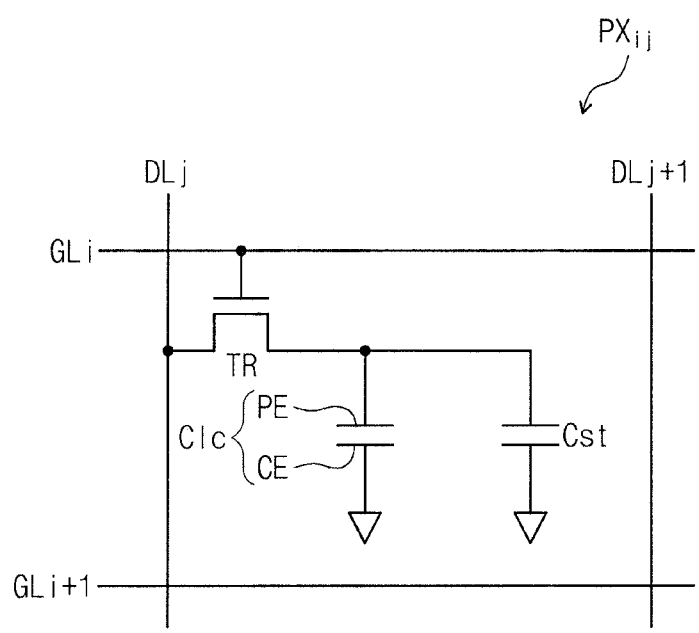
FIG. 5 is an equivalent circuit diagram of a pixel illustrated in FIG. 4.

FIG. 4 is a block diagram of a display device according to an embodiment of the inventive concept. FIG. 5 is an equivalent circuit diagram of a pixel illustrated in FIG. 4.

Referring to FIG. 4, a display panel DP is divided into: a display area DA (in which a plurality of pixels PX11 to PXnm are formed), and a non-display area NDA surrounding the display area DA.

A plurality of gate lines GL1 to GLn and a plurality of data lines DL1 to DLm intersecting or crossing the gate lines are disposed on a first substrate SUB1. In FIG. 4, only a portion of the plurality of gate lines GL1 to GLn and the plurality of data lines DL1 to DLm are illustrated.

The plurality of gate lines GL1 to GLn are connected to a gate driving circuit 100 configured to receive gate signals in a sequential manner. The plurality of data lines DL1 to DLm are connected to a data driving circuit 200 configured to receive analog data signals (or data voltages).

The plurality of pixels PX11 to PXnm are connected to corresponding gate lines of the plurality of gate lines GL1 to GLn and to corresponding data lines of the plurality of data lines DL1 to DLm, respectively.

The gate driving circuit 100 may be concurrently or simultaneously formed with the pixels PX11 to PXnm through a thin film process. For example, the gate driving circuit 100 may be mounted in the non-display area NDA in the form of an amorphous silicon TFT gate driver circuit (ASG).

The gate driving circuit 100 is connected to left ends of the plurality of gate lines GL1 to GLn, but this is only an example. The display device may include two gate driving circuits. One of the two gate driving circuits may be connected to the left ends of the plurality of gate lines GL1 to GLn, while the other is connected to right ends of the plurality of gate lines GL1 to GLn. Further, one of the two gate driving circuits may be connected to odd gate lines, while the other is connected to even gate lines.

The data driving circuit 200 receives data signals from a timing controller mounted on a circuit substrate 300 to generate analog data signals corresponding to the data signals.

The data driving circuit 200 includes a driver chip 210 and a flexible circuit substrate 220 on which the driver chip 210 is mounted. The driver chip 210 and the flexible circuit substrate 220 may each be provided in plurality, respectively. The flexible circuit substrate 220 electrically connects the circuit substrate 300 and the first substrate SUB1. The plurality of driver chips 210 provide data signals to corresponding data lines, respectively.

FIG. 4 illustrates an example of the data driving circuit 200 formed in a tape carrier package (TCP); however the data driving circuit 200 may be mounted on the first substrate SUB1 in a Chip on Glass (COG) manner.

Each of the plurality of pixels PX11 to PXnm illustrated in FIG. 4 may have an equivalent circuit illustrated in FIG. 5.

As shown in FIG. 5, a pixel PXij includes a thin film transistor TR, a liquid crystal capacitor Clc, and a storage capacitor Cst. The thin film transistor TR is electrically connected to an $i^{th}$ gate line GLi and a $j^{th}$ data line. The thin film transistor TR outputs a data signal received from the $j^{th}$ data line DLj in response to a gate signal received from the $i^{th}$ gate line GLi.

The liquid crystal capacitor Clc includes a pixel electrode PE and a common electrode CE. The pixel electrode PE is electrically connected to the thin film transistor TR to receive a data voltage corresponding to the data signal outputted from the $j^{th}$ data line DLj. The common electrode CE receives a common voltage. In the liquid crystal capacitor Clc, arrangement of liquid crystal directors included in a liquid crystal layer changes in accordance with the difference in the amount of charges between the data voltage received in the pixel electrode PE and the common voltage received in the common electrode CE. Depending on the arrangement of the liquid crystal directors, light entering the liquid crystal layer is transmitted or blocked.

The storage capacitor Cst is connected in parallel to the liquid crystal capacitor Clc. The storage capacitor Cst maintains the arrangement of the liquid crystal directors for a set or predetermined period.

Meanwhile, as described above, the gate driving circuit 100 includes a transistor connected to the thin film transistor TR, and the transistor included in the gate driving circuit 100 may be formed together with the thin film transistor TR on the first substrate SUB1 by the same thin film process.

In this case, the transistor included in the gate driving circuit 100 is formed on the first substrate SUB1 to overlap the non-display area NDA, and the thin film transistor TR may be formed on the first substrate SUB1 to overlap the display area DA.

Figure 6:
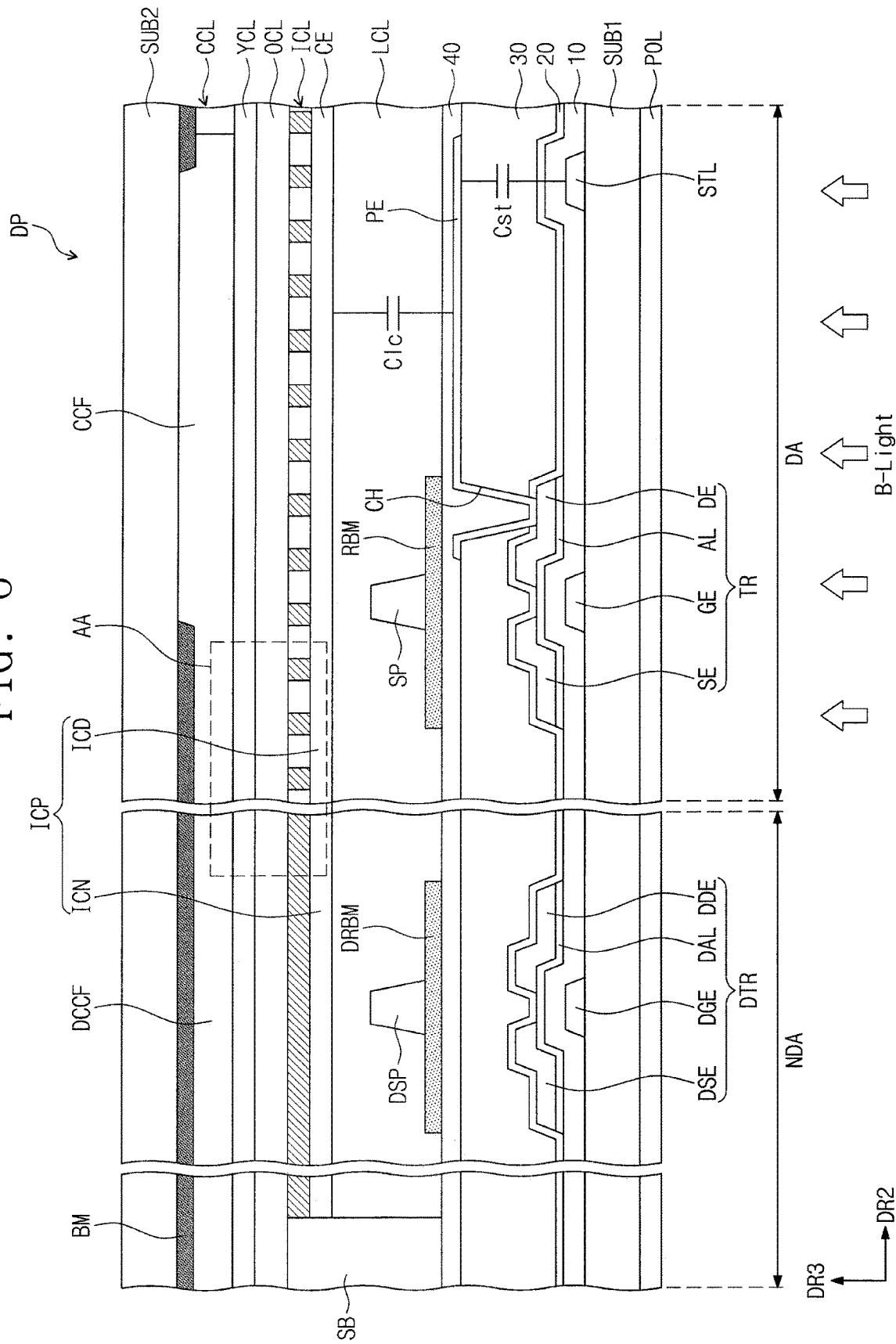
FIG. 6 is a cross-sectional view of a display panel according to an embodiment of the inventive concept, when viewed from one side surface thereof.
Figure 7:
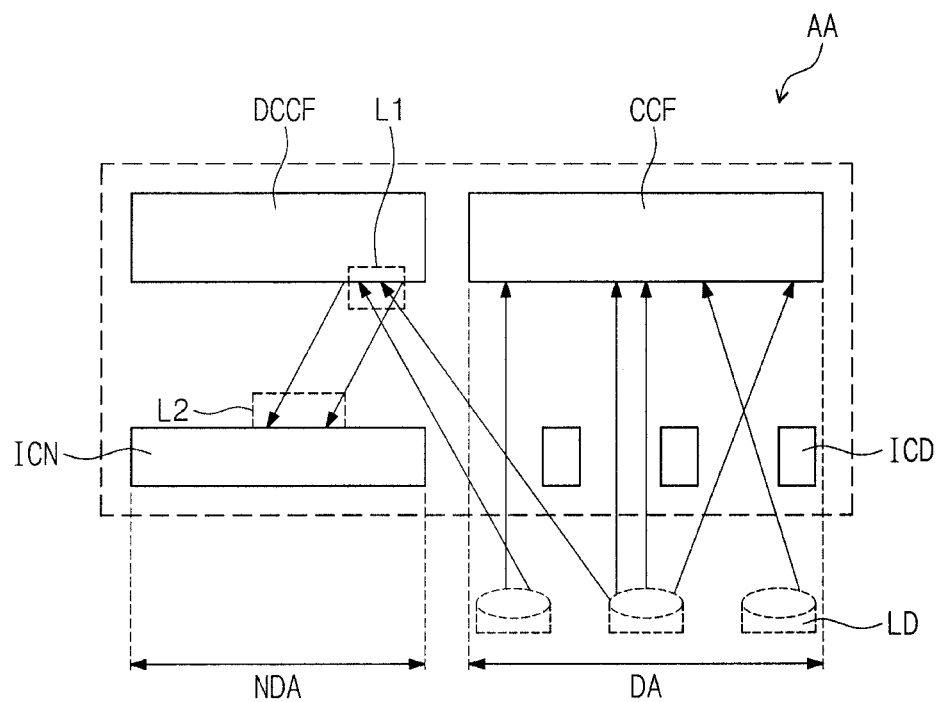
FIG. 7 is an enlarged view of region AA illustrated in FIG. 6.

FIG. 6 is a cross-sectional view of a display panel according to an embodiment of the inventive concept, when viewed from one side surface thereof. FIG. 7 is an enlarged view of region AA illustrated in FIG. 6.

FIG. 6 is a cross-sectional view of the display panel DP, which exemplarily illustrates the gate driving circuit 100 (see FIG. 4) disposed in the non-display area NDA and the thin film transistor TR (see FIG. 5) of the pixel PX disposed in the display area DA. Further, among the elements of the display panel DP illustrated in FIG. 6, the elements described in FIG. 2 are substantially identical, and thus description thereof will not be provided.

Referring to FIG. 6, the polarizing layer POL may be disposed on the lower surface of the first substrate SUB1. Further, the thin film transistor TR of the pixel PX may be disposed on the first substrate SUB1 to overlap the display area DA. The thin film transistor TR includes a gate electrode GE, an active layer AL overlapping the gate electrode GE, a drain electrode DE connected to the data line DL (see FIG. 4), and a source electrode SE disposed to be spaced from the drain electrode DE.

A driving transistor DTR may be disposed on the first substrate SUB1 to overlap the non-display area NDA. The driving transistor DTR includes a driving gate electrode DGE, a driving active layer DAL overlapping the driving gate electrode DGE, a driving source electrode DSE, and a driving drain electrode DDE disposed to be spaced from the driving source electrode DSE.

Meanwhile, one thin film transistor TR and one driving transistor DTR are illustrated in FIG. 6 for the convenience of explanation. However, the thin film transistor TR may be disposed on the first substrate SUB1 to correspond to the number of pixels PX, and the driving transistor DTR may be disposed in plurality on the first substrate SUB1 according to operating characteristics of the gate driving circuit 100.

In more detail, a storage line STL, a gate line GL (see FIG. 4), and a signal line are disposed on the first substrate SUB1. The gate electrode GE may be branched from the gate line GL. The driving gate electrode DGE may be branched from a signal line connected to the gate driving circuit 100.

A first insulating layer 10 covers the gate electrode GE, the driving gate electrode DGE, and the storage line STL.

The active layer AL overlapping the display area DA, the drain electrode DE, and the source electrode SE are disposed on the first insulating layer 10. The active layer AL overlaps the gate electrode GE, and may include a semiconductor layer and an ohmic contact layer. The drain electrode DE and the source electrode SE may be disposed on the active layer AL. Each of the drain electrode DE and the source electrode SE overlaps at least partially the active layer AL.

Further, the driving active layer DAL, the driving drain electrode DDE, and the driving source electrode DSE, which all overlap the non-display area NDA, are disposed on the first insulating layer 10. The driving active layer DAL overlaps the driving gate electrode DGE, and may include the semiconductor layer. The driving drain electrode DDE and the driving source electrode DSE may be disposed on the driving active layer DAL. Each of the driving drain electrode DDE and the driving source electrode DSE overlaps by at least a portion with the driving active layer DAL.

A second insulating layer 20 covering the driving transistor DTR and the thin film transistor TR is disposed on the first insulating layer 10. A third insulating layer 30 providing a planarization layer is provided on the second insulating layer 20.

A pixel electrode PE may be disposed on the third insulating layer 30. The pixel layer PE is connected to the drain electrode DE through a contact hole CH penetrating the second insulating layer 20 and the third insulating layer 30. A fourth insulating layer 40 covering the pixel electrode PE is disposed on the third insulating layer 30.

A first light blocking member RBM overlapping the thin film transistor TR and a second light blocking member DRBM overlapping the driving transistor DTR are disposed on the fourth insulating layer 40. The first light blocking member RBM and the second light blocking member DRBM may block light scattered from the color conversion layer CCL from being provided to the thin film transistor TR and the driving transistor DTR.

According to embodiments of the inventive concept, the first light blocking member RBM and the second light blocking member DRBM may each include a color component identical to red light emitted from the first light emitter EP-R described as above with reference to FIG. 3. That is, the first and second light blocking members RBM, DRBM each having a red component may block the blue light entering from a portion under the first substrate SUB1 from being delivered to the thin film transistor TR and the driving transistor DTR. Further, the first and second light blocking members RBM, DRBM each having the red component may block blue light reflected by the in-cell polarizing layer ICL from being delivered to the thin film transistor TR and the driving transistor DTR.

Specifically, when compared to a light blocking member having components of different colors, the first and second light blocking members RBM and DRBM each having the red component may reduce residues occurring after a light blocking member process, and may have an excellent light blocking effect against blue light.

Further, a first column spacer SP may be disposed on the first light blocking member RBM, and a second column spacer DSP may be disposed on the second light blocking member DRBM. The first column spacer SP and the second column spacer DSP may maintain a cell gap of the liquid crystal layer LCL. Meanwhile, depending on embodiments, the first light blocking member RBM and the first column spacer SP may be provided in an integral shape, and the second light blocking member DRBM and the second column spacer DSP may be provided in an integral shape.

However, the technical spirit of the inventive concept is not limited thereto, and the first light blocking member RBM and the first column spacer SP may be provided in different layers from each other. For example, the first light blocking member RBM may be disposed on the third insulating layer 30 so as to cover the thin film transistor TR. Likewise, the second light blocking member DRBM and the second column spacer DSP may be provided in different layers from each other. For example, the second light blocking member DRBM may be disposed on the third insulating layer 30 so as to cover the driving transistor DTR.

The color conversion layer CCL is disposed on the lower surface of the second substrate SUB2. The color conversion layer CCL is illustrated to include a color conversion unit CCF overlapping the display area DA and a dummy conversion unit DCCF overlapping the non-display area NDA.

Meanwhile, according to illustration of FIG. 6, the color conversion unit CCF overlapping the display area DA may be any one of the plurality of conversion units described with reference to FIG. 3. Further, one dummy conversion unit DCCF overlapping the non-display area NDA is illustrated through FIG. 6, but embodiments of the inventive concept is not limited thereto. That is, a plurality of dummy conversion units overlapping the non-display area NDA may be disposed on the second substrate SUB2. In this case, the plurality of dummy conversion units may be substantially the same in configuration as the first to third conversion units CCF1 to CCF3 disclosed through FIG. 3.

As an example, the dummy conversion unit DCCF illustrated in FIG. 6 may be the first conversion unit CCF1 including the first light emitter EP-R and the second conversion unit CCF2 including the second light emitter EP-G. Hereinafter, according to the description of the inventive concept, the dummy conversion unit DCCF will be described as being substantially the same as the first conversion unit CCF1 including the first light emitter EP-R.

A light control layer YCL may be disposed on the color conversion layer CCL, and the in-cell polarizing layer ICL may be disposed on the light control layer YCL. Further, a common electrode CE may be disposed on the in-cell polarizing layer ICL. In one embodiment, an additional insulating layer may be disposed between the in-cell polarizing layer ICL and the common electrode CE.

An arrangement of liquid crystal molecules of the liquid crystal layer LCL disposed between the first substrate SUB1 and the second substrate SUB2 may be determined on the basis of the voltage level between the pixel electrode PE and the common electrode CE.

According to embodiments of the inventive concept, the in-cell polarizing layer ICL may include a polarizing pattern ICP. Specifically, the polarizing pattern ICP may transmit light oscillating in a different direction orthogonal to the one direction described in FIG. 2 in the display area DA. Further, the polarizing pattern ICP may reflect incident light in the non-display area NDA.

The polarizing pattern ICP includes a wire grid pattern ICD overlapping the display area DA and a reflection pattern ICN overlapping the non-display area NDA.

A sealing member SB may be disposed between the first substrate SUB1 and the second substrate SUB2, along an edge of the non-display area NDA. The sealing member SB may seal liquid crystal molecules LC included in the liquid crystal layer LCL.

Referring to FIG. 7, only the configurations of the dummy conversion unit DCCF and the in-cell polarizing layer ICL among the elements illustrated in FIG. 6 are illustrated and the remaining configurations are omitted.

Meanwhile, as described above, the light source BLU may include a plurality of emitting elements LD. The emitting elements LD may output blue light as a first color light for ease of description.

A portion of the first color light outputted from the emitting elements LD is provided to the conversion unit CCF through the wire grid pattern ICD, and another portion of the first color light may be provided to the dummy conversion unit DCCF through the wire grid pattern ICD. In this case, the dummy conversion unit DCCF may receive the first color light. Hereinafter, the first color light delivered to the dummy conversion unit DCCF is described as first light L1.

The dummy conversion unit DCCF scatters the first incident light L1 into red light which is second color light. Hereinafter, the light scattered and emitted from the dummy conversion unit DCCF is described as second light L2.

A portion of the second light L2 emitted from the dummy conversion unit DCCF may be delivered towards the driving transistor DTR disposed in the non-display area NDA. However, the second light L2 emitted from the dummy conversion unit DCCF is unable to be delivered to the driving transistor DTR by the reflection pattern ICN. That is, the second light L2 emitted from the dummy conversion unit DCCF is reflected by the reflection pattern ICN to be delivered to the dummy conversion unit DCCF or the conversion unit CCF.

Thus, the driving transistor DTR may be prevented from being damaged by the second light L2 emitted from the dummy conversion unit DCCF.

Figure 8A:
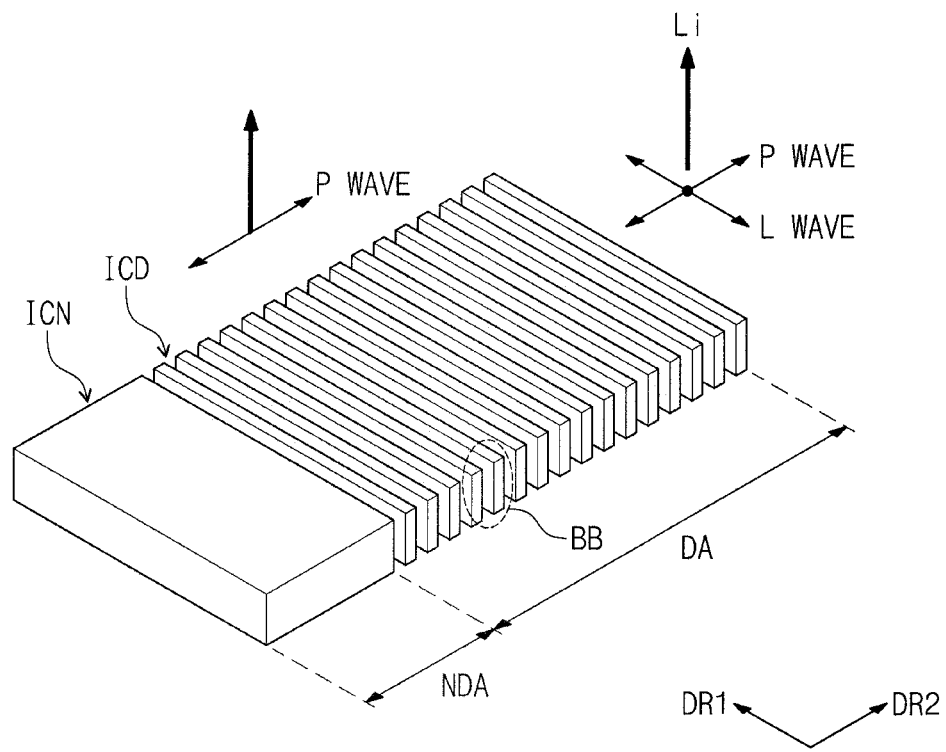
FIG. 8A is a perspective view of an in-cell polarizing layer according to an embodiment of the inventive concept.
Figure 8B:
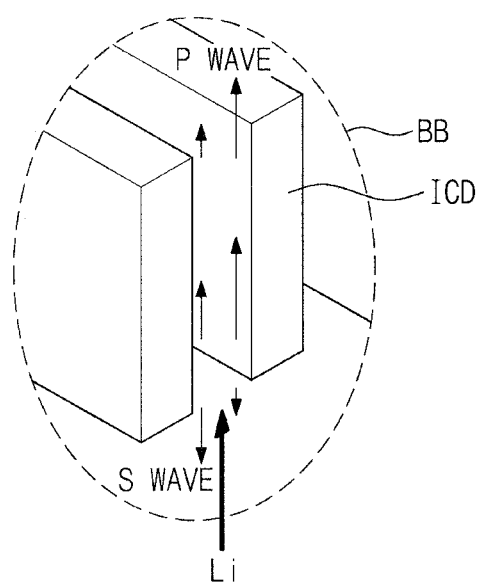
FIG. 8B is an enlarged view of region BB illustrated in FIG. 8A.

FIG. 8A is a perspective view of an in-cell polarizing layer according to an embodiment of the inventive concept. FIG. 8B is an enlarged view of region BB illustrated in FIG. 8A.

Referring to FIGS. 8A and 8B, the wire grid patterns ICD may extend in a first direction DR1, and may be arranged parallel to each other while being spaced by a set or predetermined distance in a second direction DR2.

The wire grid pattern ICD polarizes first incident color light (hereinafter referred to as incident light Li). In more detail, an L wave which is a polarization component parallel to the first direction DR1, which is an extension direction of the wire grid pattern ICD, of the incident light Li is reflected by metallic properties of the wire grid pattern ICD. A P wave which is a polarization component parallel to the second direction DR2, which is a direction orthogonal to the extension direction of the wire grid pattern ICD is recognized as an effective refraction medium, thereby being transmitted. That is, given that an arrangement cycle of the wire grid pattern is "T", if a wavelength of the incident light Li is shorter than the arrangement cycle T, reflection and transmission occur depending on the polarization component.

Figure 9A:
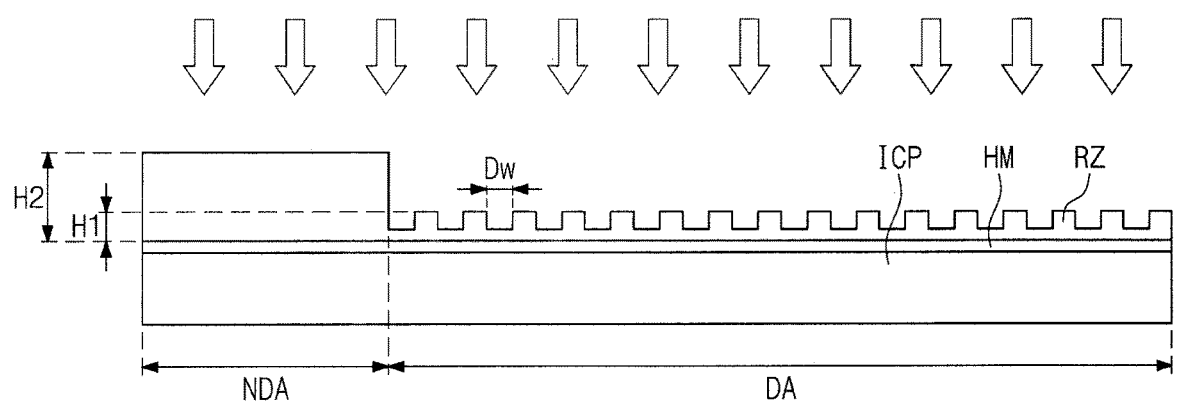
FIGS. 9A and 9B are views illustrating a method of manufacturing an in-cell polarizing layer according to an embodiment of the inventive concept.
Figure 9B:
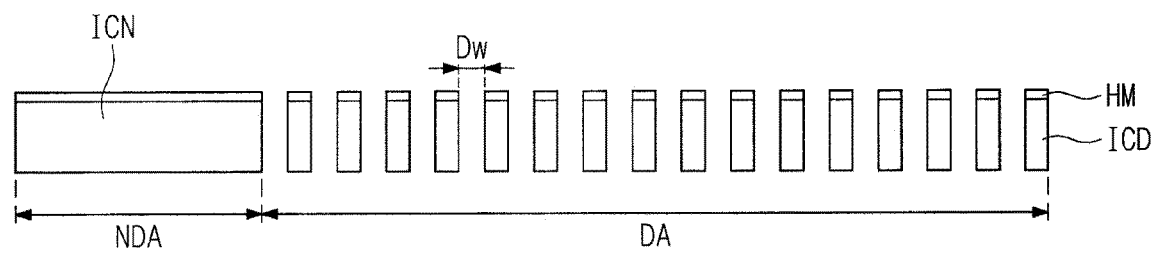

FIGS. 9A and 9B are views illustrating a method of manufacturing an in-cell polarizing layer according to an embodiment of the inventive concept.

Referring to FIGS. 9A and 9B, a manufacturing process of the polarizing pattern ICP is described. In more detail, the polarizing pattern ICP may be provided in a rectangular shape, a protection pattern HM may be disposed on the polarizing pattern ICP, and a resin pattern RZ may be disposed on the protection pattern HM.

According to embodiments of the inventive concept, a mask pattern for forming a wire grid pattern ICN may be formed in the resin pattern RZ that overlaps the display area DA. For example, the resin pattern RZ overlapping the display area DA may include a base part and protrusions protruding from the base part and spaced by a constant width Dw from each other.

According to embodiments of the inventive concept, the thickness H2 of the resin pattern RZ overlapping the non-display area NDA may be greater than the thickness H1 of the resin pattern RZ overlapping the non-display area NDA. As illustrated in FIG. 6, the reflection pattern ICN does not have a separate mask pattern formed therein, unlike the wire grid pattern ICD. That is, if the wire grid pattern ICD is formed in the polarizing pattern ICP overlapping the display area DA through a laser or other etching method, a separate pattern may not be formed in the reflection pattern ICN if the resin pattern RZ overlapping the non-display area NDA becomes thicker.

Meanwhile, the wire grid pattern ICD may be formed on the polarizing pattern ICP overlapping the display area DA through laser or other etching methods. Finally, the wire grid pattern ICD overlapping the display area DA may have an arrangement spaced by the constant width Dw. Further, the protection pattern HM may be disposed on the wire grid pattern ICD.

Figure 10:
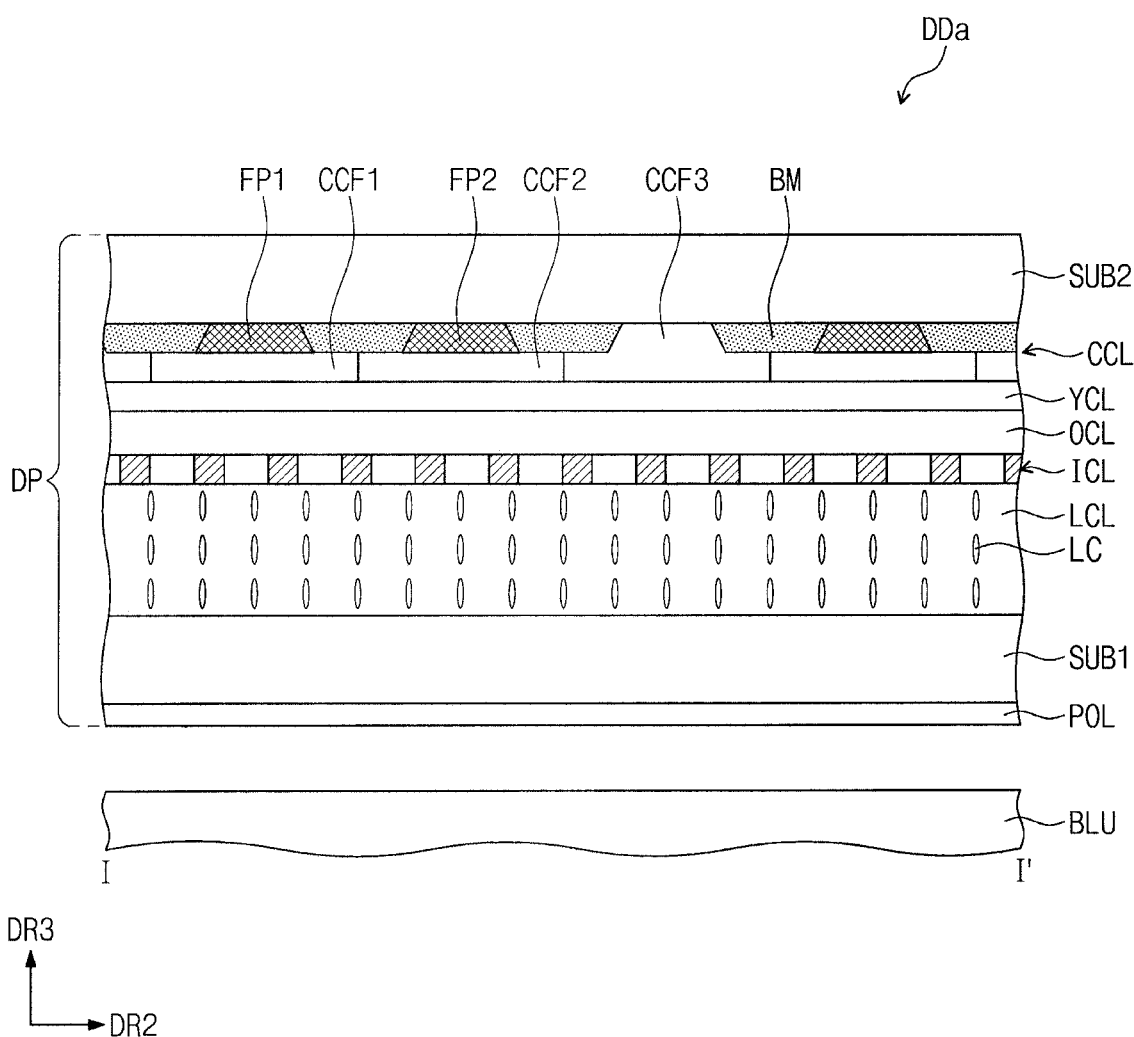
FIG. 10 is a cross-sectional view of a display panel according to another embodiment of the inventive concept, when viewed from one side surface thereof.

FIG. 10 is a cross-sectional view of a display panel according to another embodiment of the inventive concept, when viewed from one side surface thereof.

A display device DDa illustrated in FIG. 10 merely has optical filters FP1 and FP2 as additional elements when compared to the display device DD illustrated in FIG. 2, and the remaining elements may be substantially the same. Accordingly, description thereof will not be provided.

Referring to FIG. 10, the optical filters FP1 and FP2 may be included on the color conversion layer CCL. The optical filters FP1 and FP2 may be disposed on the color conversion units CCF1 to CCF3, thereby blocking the first color light and transmitting the second color light or the third color light. That is, the optical filters FP1 and FP2 may block the blue light while transmitting the green light and the red light.

The optical filters FP1 and FP2 may be formed in one layer, or may be in a form in which a plurality of layers are laminated. For example, the optical filters FP1 and FP2 may be a single layer including a material absorbing the blue light, or may have a structure in which a low refractive index layer and a high refractive index layer are laminated, as in the reflection layer.

Further, the optical filters FP1 and FP2 may include a pigment or dye, thereby blocking light of a specific wavelength. For example, in an embodiment, the optical filters FP1 and FP2 each may be a yellow color filter layer that absorbs the blue light in order to block the blue light.

The optical filters FP1 and FP2 may include a first optical filter FP1 disposed on the first conversion unit CCF1 and a second optical filter FP2 disposed on the second conversion unit CCF2. The first optical filter FP1 may be a filter layer blocking the blue light while transmitting the red light. Further, the second filter FP2 may be a filter layer blocking the blue light while transmitting the green light.

The first optical filter FP1 disposed on the first conversion unit CCF1 may include a red pigment, a phosphor, and/or a quantum dot that emits red light. Further, the first optical filter FP1 may include a phosphor and/or a quantum dot that emits red light, and a phosphor and/or a quantum dot that emits green light.

The second optical filter FP2 disposed on the second conversion unit CCF2 may include a green pigment, a phosphor, and/or a quantum dot that emits green light. Further, the second optical filter FP2 may include a phosphor emitting green light, and a phosphor and/or a quantum dot that emits red light.

According to an embodiment of the inventive concept, the in-cell polarizing layer may include a wire grid pattern overlapping the display area, and a reflection pattern overlapping the non-display area. As a result, the light outputted from the dummy conversion unit disposed in the non-display area may be prevented or protected from being delivered to the driving transistor disposed in the non-display area by the reflection pattern.

Thus, the driving circuit disposed in the non-display area may be prevented or protected from being damaged.

Hitherto, embodiments have been disclosed in the drawings and specification. While specific terms were used, they were not used to limit the meaning or the scope of the present invention described in claims, but merely used to explain the present invention. Accordingly, a person having ordinary skill in the art will understand from the above that various modifications and other equivalent embodiments are also possible. Hence, the real protective scope of the present invention shall be determined by the technical scope of the accompanying claims and equivalents thereof.

What is claimed is:

1. A display device comprising:
a display panel having a display area and a non-display area; and
a light source configured to output a first color light to the display panel, wherein
the display panel comprises:
a first substrate;
a second substrate facing the first substrate and disposed farther from the light source than the first substrate;
a liquid crystal layer between the first substrate and the second substrate;
a color conversion layer between the liquid crystal layer and the second substrate and comprising a first light emitter configured to absorb the first color light outputted from the light source and to emit a second color light that is different from the first color light;
a pixel electrode overlapping the display area and disposed between the first substrate and the second substrate;
a first transistor connected to the pixel electrode;
a driving circuit comprising a second transistor overlapping the non-display area, and providing a driving signal to the first transistor;
a light blocking member on the first substrate and overlapping the first transistor; and
an polarizing layer between the liquid crystal layer and the color conversion layer, and comprising a wire grid pattern overlapping the display area and a reflection pattern extending from the wire grid pattern to overlap the non-display area, wherein
the light blocking member has the same color component as the second color light.

2. The display device of claim 1, wherein
the color conversion layer comprises:
a conversion unit overlapping the display area and comprising the first light emitter; and
a dummy conversion unit overlapping the non-display area.

3. The display device of claim 2, wherein
the dummy conversion unit fully overlaps the reflection pattern.

4. The display device of claim 2, wherein
the color conversion layer further comprises a second light emitter configured to absorb the first color light and to emit a third color light that is different from the second color light.

5. The display device of claim 4, wherein
the dummy conversion unit comprises any one of the first light emitter and the second light emitter.

6. The display device of claim 4, wherein
the conversion unit comprises:

a first conversion unit comprising the first light emitter;
a second conversion unit comprising the second light emitter; and
a third conversion unit configured to transmit the first color light.

7. The display device of claim 6, wherein
the first to third conversion units are disposed to be spaced apart from each other when viewed in a plane, and
the color conversion layer further comprises a blocking member disposed between the first to third conversion units that are spaced apart from each other.

8. The display device of claim 6, wherein
the color conversion layer further comprises an optical filter unit configured to reflect the first color light.

9. The display device of claim 8, wherein
the optical filter unit comprises:
a first optical filter unit on the first conversion unit and configured to transmit the second color light; and
a second optical filter on the second conversion unit and configured to transmit the third color light.

10. The display device of claim 4, wherein
the particle size of the first light emitter is different from the particle size of the second light emitter.

11. The display device of claim 2, wherein
the light blocking member comprises:
a first light blocking member overlapping the first transistor; and
a second light blocking member overlapping the second transistor.

12. The display device of claim 11, wherein
each of the first light blocking member and the second light blocking member has a red component to block blue light.

13. The display device of claim 12, wherein
the dummy conversion unit comprises the first light emitter, and wherein
the first color light is blue light, and the second color light is red light.

14. The display device of claim 11, further comprising
a first column spacer on the first light blocking member; and
a second column spacer on the second light blocking member.

15. The display device of claim 1, further comprising
a sealing member overlapping the non-display area and connecting the first substrate to the second substrate, wherein
the reflection pattern overlaps the remaining non-display area other than the area of the non-display area overlapping sealing member.

16. The display device of claim 1, further comprising
a light control layer between the color conversion layer and the polarizing layer, and configured to transmit the first color light and reflect the second color light.

17. The display device of claim 16, wherein
the first color light is blue light, and the second color light is any one of green light and red light.

18. The display device of claim 1, wherein
the polarizing layer further comprises a protection pattern on the reflection pattern and on the wire grid pattern.

19. The display device of claim 1, wherein
the color conversion layer comprises a conversion unit overlapping the display area and comprising the first light emitter, wherein
the conversion unit comprises:
a first conversion unit comprising the first light emitter;
a second conversion unit comprising a second light emitter configured to absorb the first color light and to emit a third color light that is different from the second color light; and
a third conversion unit configured to transmit the first color light.

20. A display device comprising:
a display panel having a display area and a non-display area; and
a light source configured to output a first color light to the display panel, wherein
the display panel comprises:
a first substrate;
a second substrate facing the first substrate and disposed farther from the light source than the first substrate;
a color conversion unit on the second substrate, overlapping the display area, and configured to absorb the first color light outputted from the light source and to emit a second color light that is different from the first color light;
a first polarizing layer on the color conversion unit and comprising a wire grid pattern overlapping the display area and a reflection pattern extending from the wire grid pattern to overlap the non-display area; and
a second polarizing layer under the first substrate, wherein
a dummy conversion unit fully overlaps the reflection pattern.

* * * * *